Figure 1:
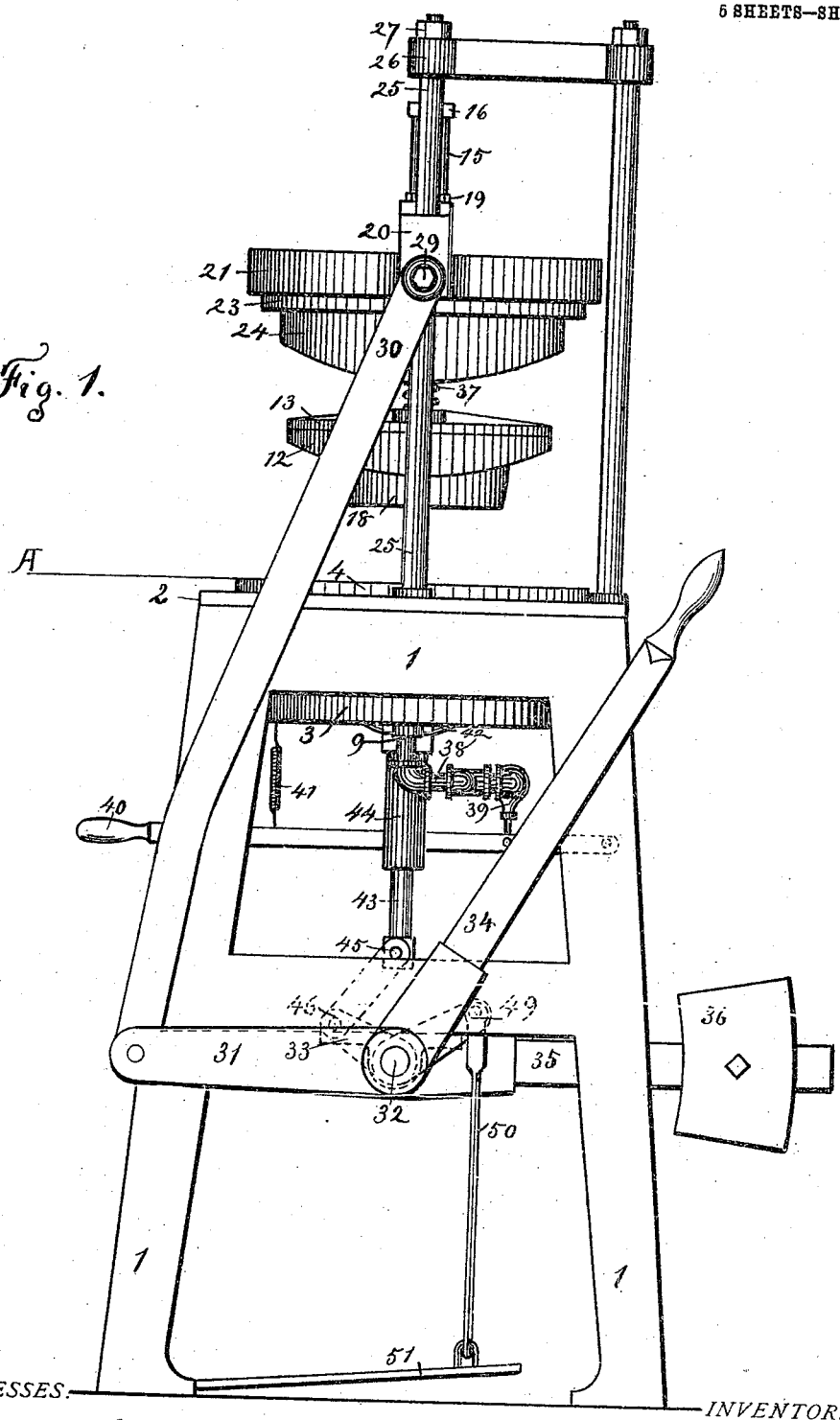

C. E. SACKETT.
HAT BRIM MATRICING AND FLANGING MACHINE.
APPLICATION FILED MAR 29, 1909.

950,244.

Patented Feb. 22, 1910.
5 SHEETS—SHEET 1.

WITNESSES:
INVENTOR.

C. E. SACKETT.
HAT BRIM MATRICING AND FLANGING MACHINE.
APPLICATION FILED MAR 29, 1909.

Patented Feb. 22, 1910.

WITNESSES: INVENTOR.

C. E. SACKETT.
HAT BRIM MATRICING AND FLANGING MACHINE.
APPLICATION FILED MAR. 29, 1909.

950,244.

Patented Feb. 22, 1910.
5 SHEETS—SHEET 3.

WITNESSES:

INVENTOR.

C. E. SACKETT.
HAT BRIM MATRICING AND FLANGING MACHINE.
APPLICATION FILED MAR 29, 1909.

950,244.

Patented Feb. 22, 1910.

5 SHEETS—SHEET 4.

WITNESSES:
James P. Wilson
E. R. Wilson

INVENTOR.
Chas. E. Sackett

C. E. SACKETT.
HAT BRIM MATRICING AND FLANGING MACHINE.
APPLICATION FILED MAR. 29, 1909.
950,244.                                    Patented Feb. 22, 1910.
5 SHEETS—SHEET 5.
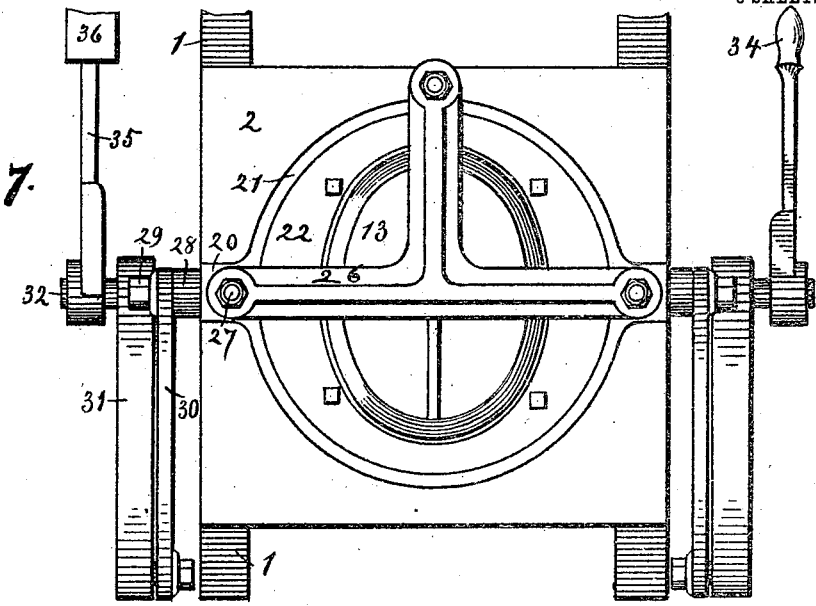
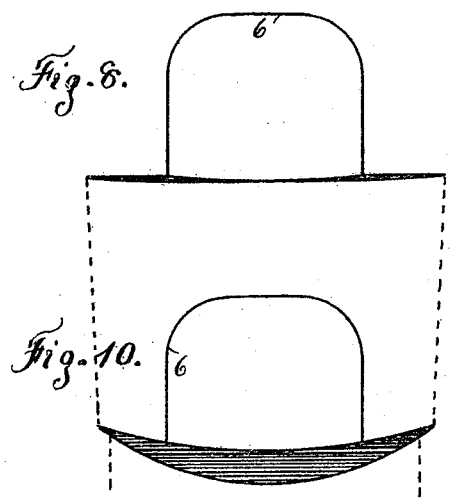
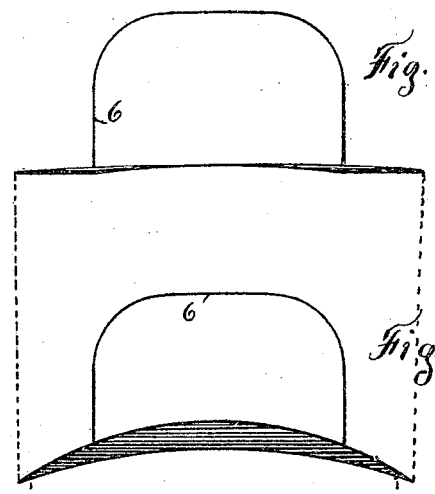
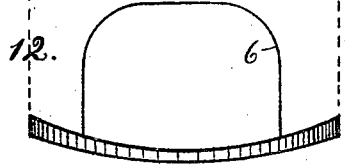
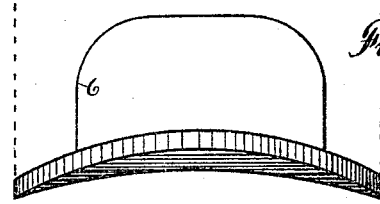
WITNESSES:                                          INVENTOR.

UNITED STATES PATENT OFFICE.

CHARLES E. SACKETT, OF DANBURY, CONNECTICUT.

HAT-BRIM MATRICING AND FLANGING MACHINE.

950,244.  Specification of Letters Patent.  Patented Feb. 22, 1910.

Application filed March 29, 1909. Serial No. 486,520.

*To all whom it may concern:*

Be it known that I, CHARLES E. SACKETT, a citizen of the United States, residing at the city of Danbury, in the county of Fairfield and State of Connecticut, have invented a new and useful Improvement in Hat-Brim Matricing and Flanging Machines, of which the following is a specification.
This invention relates to that part of the manufacture of hats, which consists in shaping and setting the hat brim, and is adapted to the manufacture of both soft and stiff hats.
On the 8th day of February, 1909, I filed serial application No. 476,816 for a "Process for shaping and setting hat brims."

The invention herein described and illustrated is a machine for carrying out the first part of that process, a machine covering the second part of the process being the subject of serial application No. 488,375, filed April 7th, 1909.

The object of this invention is broadly, to matrice, or give to a hat brim in its flat state its final lateral and longitudinal curvatures before doing anything toward curling or reversing its edges, which is contrary to the usual course of procedure, especially in stiff hats, the general practice being to curl or reverse the edge in the flat state by a suitable curling machine, and then matrice or give the hat brim its curvatures as a final process; in so doing the curl is simply strained into its droop at front and rear, and upward curve at the sides of the hat, without changing its fiber, and as a consequence there is always a tendency for it to revert to its flat state, and the hat brim loses its shape.

In this invention, the curl is formed on the edge of the hat brim, by softening, breaking down, and reconstructing the fibers of the curl after the hat brim has received its final curvatures at front, rear and sides; as a consequence there will be no strain on the curl, and no tendency to revert to a flat state; on the contrary, the curl or reversed welt then forms an arch from front to rear which supports and stiffens the hat brim, and there will be no tendency for it to lose its shape; all stiff hats are now wired to help support the curves of the brim.

The invention consists in a suitable mechanism for first slightly steaming the hat brim over an open steam pot which is part of the machine, then matricing the brim by a suitable mechanism without removal from its position over the steam pot, at the same time protecting all parts of the brim and crown from any further action of the steam except the peripheral edge section designed to be reversed or curled. This section is then treated by a suitable mechanism with hot live steam to the point of saturation with moisture, and the stiffening material is thoroughly softened; it is then broken down by a suitable mechanism at right angles to the general plane of the hat and worked, and its peripheral edge shrunk until all convolutions due to change of diameter are worked out by the devices hereinafter described, and the fibers of the curled section have re-arranged themselves relatively to the lateral plane of the hat into a permanent position.

The machine for carrying out the above work is described in the following specification, and illustrated in the accompanying five sheets of drawings, in which—

Figure 2:
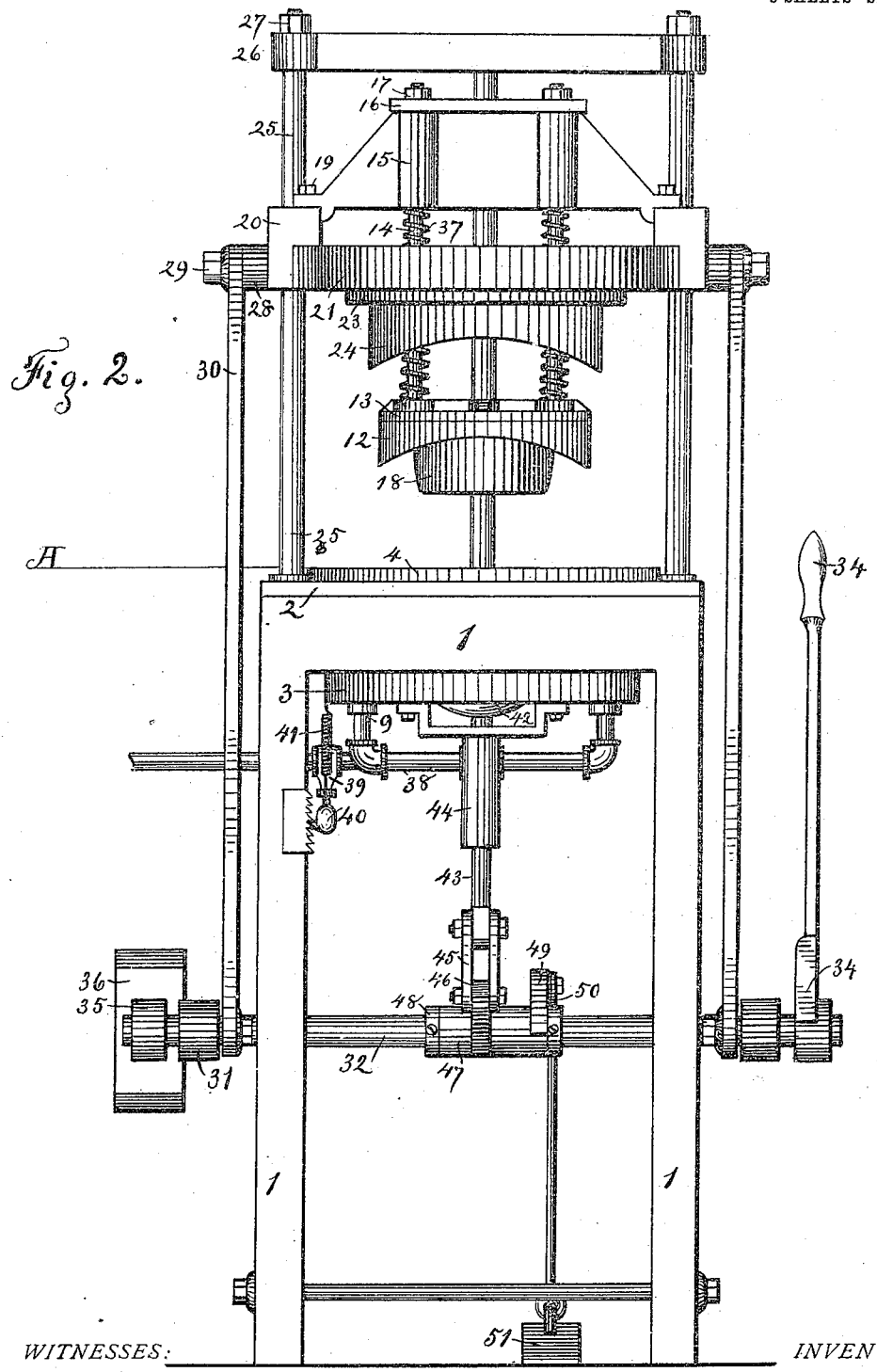
Figure 3:
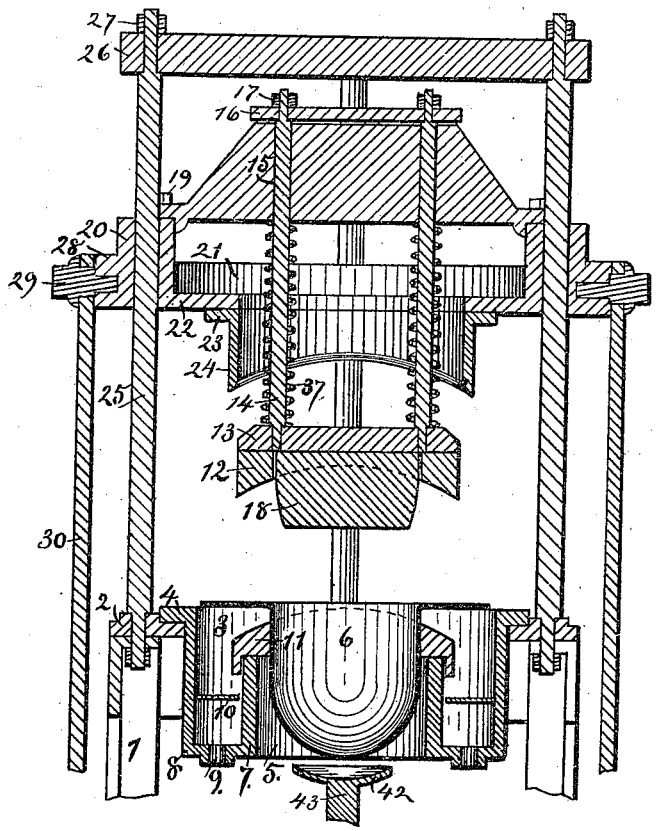
Figure 4:
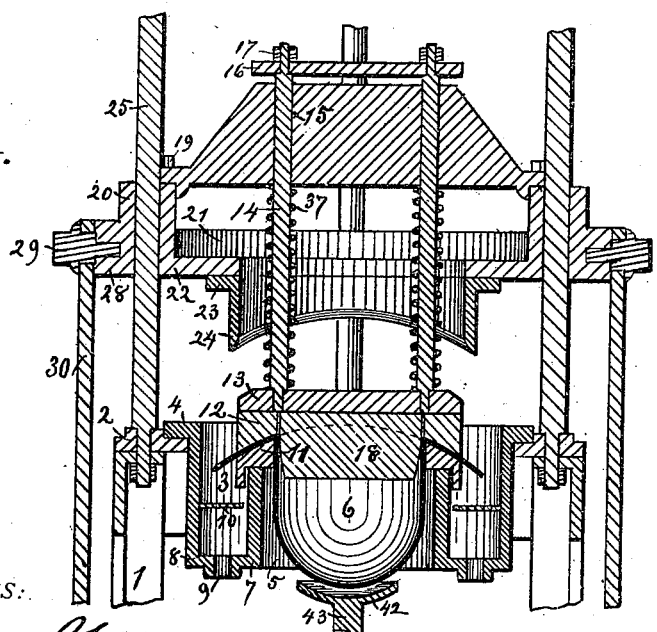
Figure 5:
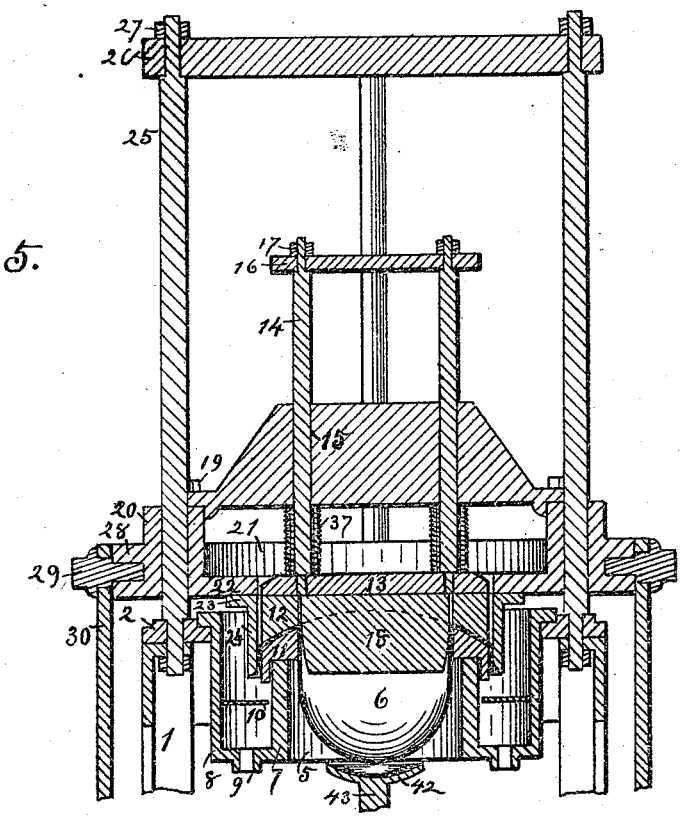
Figure 6:
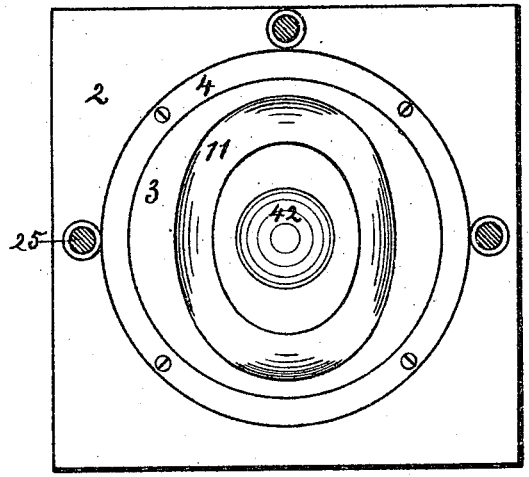

Figure 1 is a side elevation; Fig. 2 a front elevation; Fig. 3 a central cross section showing a hat brim in its flat state about to be matriced; Fig. 4 the same, after matricing; Fig. 5 the same, after breaking down the curled edge section; Fig. 6 is a plan view of Figs. 1 and 2, on line A, showing the steam pot and bed matrix; Fig. 7 is a general plan view over all; Fig. 8 is an outline lateral view of a hat brim in its flat state; Fig. 9 a longitudinal view of the same; Fig. 10 is a lateral matriced view of the hat brim; Fig. 11 a longitudinal view; Fig. 12 is a view of the flanged hat brim; Fig. 13 a longitudinal view.

In all the drawings like numerals relate to like parts.

1. is a suitable machine frame. 2. its top platform.

3. is an open steam pot (see sectional Fig. 3), supported from the platform by a flange 4; the steam pot has an oval open center space 5, adapted to receive the crown of a hat 6; this space is surrounded by an inner vertical wall 7, and an outer vertical wall 8, depending from the supporting flange 4. The walls are joined by a bottom floor tapped at 9, to receive inlet steam pipes and outlet drip pipes; about midway in the height of the pot, is arranged a perforated baffle plate 10, to distribute the steam evenly and prevent the eruption of condensed water; the steam vapor escapes freely at the open top of the pot. Removably mounted on the top of the inner oval wall of the steam pot, is an oval matrix 11, of the same ellipse and lateral and longitudinal curvatures as the top surface of a predetermined finished hat brim to be shaped thereon; supported above this matrix, is a companion matrix 12, of the same ellipse and curvatures and registering with the lower matrix; the peripheries of both matrices are vertical, and register with each other; the upper matrix is removably attached to, and supported by a press platen 13, in which are bedded two upwardly-extending guide-rods 14; these rods pass up through long vertical sliding boxes in the cross-head 15; they are joined together above the cross-head by a connecting bar 16, in which they are shouldered and retained there by the nuts 17.

Attached to the press platen on its lower side is a hat block 18; its office is to center the hat accurately in the central opening of the lower matrix, as it descends. The cross-head is secured by bolts 19, to vertical side boxes 20; these boxes are joined to each other by a vertical ring casting 21, (see Figs. 1 and 2) having an inward horizontal flange 22; depending from this flange, and removably attached to it by a similar flange 23, is a vertical oval ring 24, whose inner ellipse is of the same conformation as the vertical sides of the two lower mating matrices, plus the thickness of the felt of a hat brim to be shaped between them; the lower edge of the vertical ring is rounded outwardly, so that it may enter freely around the lower matrices, and its lower edge is curved to correspond with the usual curvature of a hat brim as a saving of material; a straight edged ring would answer the purpose just as well. The boxes of the flanged ring supporting this oval vertical ring, have a vertical sliding movement upon guide-posts 25, which are securely bedded in the machine frame, and terminate at top in a cross-bar 26, in which they are shouldered and retained by nuts 27; on the outer side of the boxes are hubs 28, into which are screwed journal pins 29, upon which are journaled depending side bars 30, which pass downward outside of the machine frame, and are journaled at their lower ends to the extremities of cranks 31, (see Fig. 1) which cranks are keyed at their fulcrum ends to a shaft 32, journaled in boxes 33, attached to the machine frame; upon one end of the shaft is secured a lever 34, on its other end an arm 35, carrying a balancing weight 36, near its extremity; upon the platen guide rods 14, are fitted spiral springs 37, which are compressible between the upper platen surface, and the cross-head through which the guide rods slide; the springs give a resilient movement to the cross-head and all parts connected with it which is felt at the operating lever, while they at the same time maintain a steady pressure upon the hat brim between the two matrices; steam is supplied to the steam pot in adjustable quantities through the connecting pipes 38, and a gate valve 39, which is operated by a hand lever 40, with a spring movement 41.

To remove the hat from the machine a metallic cup 42 is provided adapted to fit the oval hat crown; the cup is supported by a lifting rod 43, sliding in a box frame 44, attached to the bottom of the steam pot; the lower end of the lifting rod is pivoted between side bars 45, (see Fig. 2) also pivoted to the end of a crank arm 46, attached to a box 47, journaled on the shaft 32, and retained in position by the collars 48; attached to one end of the box is another crank arm 49, to the extremity of which is pivoted a depending rod 50, which is attached at its lower end to a foot treadle 51; foot pressure on the treadle will lift the hat free from the lower matrix.

The operation of the machine is as follows: When the cross-head carrying the upper matrix is elevated by the lever to its highest point as in Figs. 1, 2 and 3, a hat finished to the flat brim stage, is inserted in the central opening of the lower matrix as shown in Fig. 3. The operator then admits weak steam vapor into the steam pot sufficient to warm the brim without injuring the felt which soon places it in readiness to matrice. The lever is then drawn forward until the upper matrice has forced the hat brim into its bed upon the lower matrice, as in Fig. 4, the hat block entering the crown of the hat and positively positioning it. It will now be seen that the hat and brim are entirely protected from the further action of the steam by the matrices except the peripheral section extending into the steam pot, which is designed to be curled. This section is now subjected to the action of live hot steam, until it is limp to the point of saturation. The lever is now drawn farther forward, the guide rod springs are compressed above the upper matrix platen exerting pressure upon it, and this pressure is increased as the oval flanging ring descends around the compressed matrices, its edge breaking down the exposed section of the hat brim as shown in Fig. 5. The operator now works the lever up and down in which he is assisted by the upward pressure of the springs and the balancing weight, until he has thoroughly ironed out all the convolutions in the hat brim (due to its reduced periphery) against the vertical sides of the lower matrix, thus giving the hat brim its true peripheral curved oval, and erecting a vertical flange around it, in which the fibers of the felt have been rearranged at right angles to the lateral plane of the hat brim. The lever is then reversed, and the upper matrix and flanging ring are carried upward, and the pressure of the foot on the treadle raises the matriced hat above the surface of the steam pot. While the flange is still in its moist, warm state, (it may be further steamed if advisable) the hat is quickly transferred to a suitable machine to complete the curl. Such a machine has been described by me in serial application No. 460,353, filed October 30th, 1908, provided the flanged hat is a soft hat and flanged in its flat state, but if the hat be either a soft or stiff hat and flanged on curved matrices as herein shown, it will be best transferred to an improved curling machine adapted to curling curved hat brims, which machine will form the subject of serial application No. 488,375, filed April 7th, 1909.

Having thus described my invention, what I claim and desire to secure by Letters Patent is:

1. In a hat brim matricing and flanging machine, the combination of a machine frame supporting a platform having a large central opening, a deep steam pot supported within said opening by a vertical hanging outer wall, a circular bottom plate joined to said wall having a central aperture, a vertical inner wall rising from said bottom plate surrounding said aperture, a steam space between said walls entirely open to the upper atmosphere, steam and drip pipes connected to said bottom plate, means to distribute the steam evenly in the upper space between said rolls, and means to regulate the supply of steam to said open steam pot.

2. In a hat brim matricing and flanging machine, the combination of a machine frame supporting a platform, a steam pot supported by said platform having a vertical hanging outer wall, a vertical inner wall surrounding an aperture concentric with said outer wall, a bottom plate connecting said walls, a steam space between said walls entirely open to the upper atmosphere, means to supply and to distribute steam within said steam space, its vapor escaping freely, a hat brim bed matrix removably mounted upon the top of said inner vertical wall, said matrix having a central aperture adapted to receive the crown of a hat, and a brim section adapted to shape the brim of a hat, its periphery extending beyond said inner vertical wall into said steam space, said matrix having its higher curves adapted to support a flat hat brim, thus permitting weak steam vapor to permeate all parts of the brim thereby softening it preparatory to matricing without injury to the fabric, and means to regulate the supply of said vapor.

3. In a hat brim matricing and flanging machine, the combination of a machine frame, a platform supported thereon, a steam pot supported by said platform, a bed matrix centrally supported by said steam pot; vertical guide posts rising from said platform; a ring frame constructed with boxes sliding vertically upon said guide posts, hubs projecting from said boxes, journal pins secured in said hubs; side bars journaled on said pins passing downward outside of said machine frame; a shaft centrally arranged under said bed matrix in boxes attached to said machine frame; cranks projecting from said shaft; journal pins at the extremities of said cranks on which the lower ends of said side bars are journaled; a lever attached to one end of said shaft; an arm provided with a balance weight attached to the other end of said shaft; the said lever through said connecting mechanism being adapted to give a vertical reciprocal movement to said ring frame to and from said bed matrix.

4. In a hat brim matricing and flanging machine, the combination of a frame supporting a platform; a steam pot centered in said platform, a lower bed matrix supported on said steam pot, a central opening in said bed matrix adapted to receive the crown of a hat; vertical guide posts rising from said platform; a ring frame constructed with boxes at each side having a vertical movement on said guide posts to and from said matrix; a bridge member crossing said ring frame centrally secured to said boxes; said bridge member having vertical openings, guide rods passing upward through said openings, a press platen supported by the lower ends of said guide rods in which they are secured, a bar connecting the upper ends of said guide rods above said bridge member retained in position by a bar in which they are secured by nuts; an upper matrix in all respects conforming to and registering with said lower bed matrix removably attached to the lower side of said press platen; a hat block centrally arranged in said upper matrix and removably attached to said press platen; said platen guide rods, and connecting bar forming a frame depending from said bridge member and supporting said upper matrix at some distance below it, so that said upper matrix is seated upon said lower bed matrix, while said bridge member is about midway of its vertical movement; said guide rods sliding upward through said bridge member as it descends.

5. In a hat brim matricing and flanging machine, the combination of a machine frame, a supporting platform; a bed matrix supported by said platform, a bed matrix centered on and supported by said steam pot; a press platen, an upper matrix supported by said platen centrally arranged above and registering with said bed matrix;

guide posts rising vertically from said platform; a ring frame having a vertical movement upon said guide posts to and from said bed matrix, a bridge member secured to said ring frame; guide rods secured to said press platen passing upward through said bridge member, and spiral springs surrounding said guide rods between said bridge member and said press platen which press downward against said press platen to add to its compression as the bridge member descends, and upward against said bridge member giving it an elastic resilient movement for the purpose set forth.

6. In a hat brim matricing and flanging machine, the combination of a frame, a supporting platform, a steam pot supported thereon, a lower bed matrix centered on and supported by said steam pot; a ring frame having a vertical movement on guide posts to and from said bed matrix; said ring frame carrying a bridge member supporting an upper matrix registering with said lower matrix, and having vertical sides corresponding with the vertical sides of said lower matrix; a flanging ring removably attached to the lower side of said ring frame, and having a vertical movement with it to and from said matrices when paired together, said flanging ring having the same inner ellipse as the outer vertical sides of said matrices.

7. In a hat brim matricing and flanging machine, the combination of a frame, a supporting platform, a steam pot supported by said platform, a bed matrix centered on and supported by said steam pot; a ring frame having a vertical movement to and from said bed matrix, guide posts rising from said platform; a corresponding upper matrix supported by said ring frame, and a flanging ring adapted to surround said matrices when paired; a shaft and suitable connections to give a vertical movement to said ring frame; and a lever operating said shaft.

8. In a hat brim matricing and flanging machine, the combination of a frame; a supporting platform, an open steam pot supported thereon, said steam pot having inner and outer walls with an open steam space between them, a bed matrix centered upon and supported by said inner wall, said bed matrix having its periphery projecting into said steam space; steam inlet and outlet pipes opening in and out of said steam pot; a main pipe supplying steam to said inlet pipes; a slide valve located on said main pipe and a spring lever and rack adapted to give varying admission of steam to said steam pot.

9. In a hat brim matricing and flanging machine, the combination of a frame, a platform supported thereon, an open steam pot supported by said platform, a bed matrix centered on and supported by said steam pot, a central opening through said bed matrix and said steam pot adapted to receive the crown of a hat, a vertical hollow box secured by a frame to the bottom of said steam pot, a guide rod moving upward through said hollow box, a cup adapted to fit the crown of a hat attached to the upper end of said guide rod, a horizontal shaft centrally arranged on said machine frame below said steam pot, a hollow sleeve surrounding said shaft constructed with two projecting cranks at varying angles, parallel bars connecting the end of one of said cranks to the lower end of said guide rod, a rod connecting the end of the other crank to a foot treadle, whereby said vertical rod and cup is moved upward to expel a hat from within the walls of said steam pot.

10. In a hat brim matricing and flanging machine, the combination of a machine frame; a supported platform; an open steam pot; a bed matrix centered thereon; an upper corresponding matrix arranged above said bed matrix; a flanging ring adapted to surround said matrices when paired, arranged above said upper matrix; means to bring said upper and lower matrices into conjunction; means to give said flanging ring an up and down movement against the vertical sides of said paired matrices; means to admit steam at varying temperatures and pressure into said steam pot; and means to raise a hat above the central opening in said steam pot and bed matrix when the matrices are parted.

11. In a hat brim matricing and flanging machine, the combination with a machine frame; a supported platform, an open steam pot centered thereon; guide posts rising vertically from said platform; a ring frame having a vertical movement upon said guide posts; a bridge member centrally secured across said ring frame and moving vertically with it, removable bed matrices adapted to different sizes of hats removably securable to a vertical wall located within said steam pot; removable upper matrices corresponding to said bed matrices, adapted to different sizes of hats, removably securable to said bridge member, removable flanging rings corresponding to said matrices, and adapted to different sizes of hats, removably securable to said ring frame; the said matrices being arranged in sets, and secured a set at a time to said holding members of said machine frame, for the purpose set forth.

In testimony whereof, CHARLES E. SACKETT has signed his name to this specification in the presence of two subscribing witnesses, this 22d day of March, 1909.

CHARLES E. SACKETT.

Witnesses:
JAMES P. WILSON,
E. R. WILSON.